(12) United States Patent
Rodgers

(10) Patent No.: US 10,599,681 B2
(45) Date of Patent: Mar. 24, 2020

(54) CONFIGURABLE SEARCH CATEGORIES INCLUDING RELATED INFORMATION AND RELATED ACTION FUNCTIONALITY OVER A RELATIONAL DATABASE

(71) Applicant: ORACLE INTERNATIONAL CORPORATION, Redwood City, CA (US)

(72) Inventor: Michael Rodgers, Rochester, MN (US)

(73) Assignee: Oracle International Corporation, Redwood City, CA (US)

( * ) Notice: Subject to any disclaimer, the term of this patent is extended or adjusted under 35 U.S.C. 154(b) by 439 days.

(21) Appl. No.: 15/656,060

(22) Filed: Jul. 21, 2017

(65) Prior Publication Data

US 2018/0075130 A1    Mar. 15, 2018

Related U.S. Application Data

(60) Provisional application No. 62/395,213, filed on Sep. 15, 2016.

(51) Int. Cl.
| | |
|---|---|
| *G06F 12/02* | (2006.01) |
| *H04L 29/08* | (2006.01) |
| *G06F 17/30* | (2006.01) |
| *G06F 16/28* | (2019.01) |
| *G06F 21/62* | (2013.01) |
| *G06F 21/31* | (2013.01) |
| *G06F 16/2457* | (2019.01) |
| *H04L 29/06* | (2006.01) |

(52) U.S. Cl.
CPC ........ *G06F 16/285* (2019.01); *G06F 16/2457* (2019.01); *G06F 21/31* (2013.01); *G06F 21/6218* (2013.01); *H04L 63/102* (2013.01)

(58) Field of Classification Search
CPC .... G06F 21/31; G06F 21/6218; G06F 16/285; G06F 16/2457; H04L 63/102
USPC ......................................................... 707/737
See application file for complete search history.

(56) References Cited

U.S. PATENT DOCUMENTS

| | | | |
|---|---|---|---|
| 7,725,449 B2 | 5/2010 | Naam | |
| 7,962,446 B2 | 6/2011 | Subramaniam et al. | |
| 8,260,820 B2 | 9/2012 | Arad | |
| 8,510,330 B2 | 8/2013 | Brice et al. | |
| 8,661,033 B2 | 2/2014 | Leppert et al. | |

(Continued)

OTHER PUBLICATIONS

Oracle, "JD Edwards EnterpriseOne" published May 31, 2012, http://www.oracle.com/us/products/applications/jd-edwards-enterpriseone/overview/index.html [retrieved Aug. 2, 2017], 3 pages.

(Continued)

*Primary Examiner* — Kuen S Lu
(74) *Attorney, Agent, or Firm* — Kilpatrick Townsend & Stockton LLP

(57) ABSTRACT

A relational database system, method, and computer executed instructions capable of configurable searching across an entity's multiple databases. The system allows search categories to be augmented with specifications for the search categories, the specifications identifying rules for authorized users, locations in the database to search, rendering the results and augmenting the search results with options to present additional data and actions items. The additional data items are presented, and the executable script is executed to perform the actions items and the results presented.

20 Claims, 11 Drawing Sheets

(56) References Cited

U.S. PATENT DOCUMENTS

| | | | |
|---|---|---|---|
| 8,886,617 | B2 | 11/2014 | Grondin et al. |
| 9,177,022 | B2 | 11/2015 | Taranov et al. |
| 2008/0208808 | A1 | 8/2008 | Ryan et al. |
| 2009/0177301 | A1* | 7/2009 | Hayes ................ G11B 19/025 700/94 |
| 2009/0241018 | A1 | 9/2009 | Costello et al. |
| 2010/0049692 | A1 | 2/2010 | Astito et al. |
| 2010/0114864 | A1* | 5/2010 | Agam .................. G06F 16/951 707/709 |
| 2010/0122220 | A1* | 5/2010 | Ainsworth ........... G06F 16/957 715/866 |
| 2013/0238609 | A1 | 9/2013 | Marantz et al. |
| 2013/0246925 | A1* | 9/2013 | Ahuja ................. H04L 63/1416 715/738 |
| 2016/0162924 | A1* | 6/2016 | Rathod ............. G06Q 30/0217 705/14.19 |
| 2016/0188620 | A1 | 6/2016 | Rangappa et al. |

OTHER PUBLICATIONS

Oracle, "PeopleSoft Applications", published May 18, 2012, http://www.oracle.com/us/products/applications/peoplesoft-enterprise/overview/index.html [retrieved Aug. 2, 2017], 3 pages.

SAP Documents "SAP Net Weaver Enterprise Search", published Dec. 2010, https://help.sap.com/saphelp_nwes72/helpdata/en/fb/8cd83f6de14f9386d9b9b0a1c9396c/frameset.htm [retrieved Aug. 2, 2017] 1 page.

* cited by examiner

CONFIGURABLE SEARCH CATEGORIES INCLUDING RELATED INFORMATION AND RELATED ACTION FUNCTIONALITY OVER A RELATIONAL DATABASE

CROSS-REFERENCES TO RELATED APPLICATIONS

This application claims the benefit of U.S. Provisional Patent Application No. 62/395,213, filed on Sep. 15, 2016, entitled "CONFIGURABLE SEARCH CATEGORIES INCLUDING RELATED INFORMATION AND RELATED ACTION FUNCTIONALITY OVER A RELATIONAL DATABASE," the entire contents of which is incorporated by reference in its entirety for all purposes.

BACKGROUND

The rate at which data is generated and collected is dramatically increasing. Advancements made with respect to storage devices have allowed clients to store large quantities of data for long time periods. However, the size of data increases the complexity of retrieving data, particularly if it is not immediately known which particular data is of interest. More specifically, performing queries on large data structures can result in system expenses, both with respect to resource commitment and time. Further, tools that support general, top-level queries give rise to security concerns (to ensure that users cannot access data for which they have no authorization) and relevancy complications (e.g., to determine whether data is not only a technical match to a search term but is also predicted to be relevant to the search in general and/or context). Some technologies have provided search tools that operate within particular applications. A specific data structure managed by the application can then be queried. However, this technique is limited in terms of the data that can be accessed.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. A first enablement includes a processor-based method for configurable searching over databases, the method including receiving, from a first user device, a first set of specifications for a searching category, each specification of the first set of specifications including a constraint pertaining to performing a type of data processing or availing a type of data following an initial search. The first set of specifications identify: one or more locations in one or more databases; one or more rendering rules; one or more data rules that identify the type of data to avail with each result object of one or more result objects returned for the initial search of the searching category. The processor-based method also includes one or more action rules that identify the type of data processing available to perform with each result object of the one or more result objects returned for the initial search of the searching category. The processor-based method further includes automatically converting the first set of specifications into an initial script, where the initial script is executable. The processor-based method yet includes receiving, from a second user device, a search input and determining the search input is a member of the searching category. The method also includes, in response to the determining, executing the initial script using the search input to search the one or more databases at the one or more locations to identify the one or more result objects, the one or more result objects being a subset of a plurality of result objects stored at the one or more locations of the one or more databases. The processor-based method also includes generating one or more action scripts to perform the type of data processing identified by the one or more action rules. The method further includes rendering at least part of each result object of the one or more result objects according to the one or more rendering rules to produce one or more rendered objects. Each rendered object of the one or more rendered objects includes one or more data options indicating availability of additional data corresponding to the rendered object, and one or more action options indicating availability of data processing of the type of data processing corresponding to the rendered object. The processor-based method also includes transmitting, to the second user device, the one or more rendered objects. The method yet includes receiving, from the second user device, one or more communications that identify a rendered object of the one or more rendered object and corresponds to; a selection of an action of the one or more action options; or a selection of a data option of the one or more data options. The method further includes processing the communication by executing the action script corresponding to the rendered object or retrieving and transmitting additional data corresponding to the rendered object. Other embodiments of this aspect include corresponding computer systems, apparatus, and computer programs recorded on one or more computer storage devices, each configured to perform the actions of the methods.

Implementations may include one or more of the following features. The processor-based method for configurable searching over databases where determining the search input is a member of the searching category further includes: retrieving a plurality of category inputs in the searching category; comparing the search input to each category input of the plurality of category inputs; and determining the search input matches at least one category input of the plurality of category inputs. The processor-based method for configurable searching over databases where determining the search input is a member of the searching category where the first user device and the second user device are a same device and the same device is used by a first user. The processor-based method for configurable searching over databases where the type of data processing includes performing a subsequent search, sending a message, processing an invoice, or approving an item. The processor-based method for configurable searching over databases where the type of data includes sales orders, invoices, expenses, addresses, contacts, or instructions. The processor-based method for configurable searching over databases further including receiving a specification of the first set of specifications of the searching category pertaining to allowing authorized users and identifying a plurality of authorized users of the searching category. The processor-based method may also include detecting a user of the second user device and verifying the user is authorized for the searching category. The processor-based method for configurable searching over databases further including receiving a second set of specifications for the searching category, where a first authorized user is authorized to use the first set of specifications and a second authorized user is authorized to use the second set of specifications. Implementations of the described techniques may include hardware, a method or process, or computer software on a computer-accessible medium.

A second enablement includes a system for configurable searching over databases, the system having a relational database system performing the actions including receiving, from a first user device, a first set of specifications for a searching category, each specification of the first set of specifications including a constraint pertaining to performing a type of data processing or availing a type of data following an initial search. The first set of specifications identify: one or more locations in one or more databases; one or more rendering rules; one or more data rules that identify the type of data to avail with each result object of one or more result objects returned for the initial search of the searching category. The system also includes one or more action rules that identify the type of data processing available to perform with each result object of the one or more result objects returned for the initial search of the searching category. The system further includes automatically converting the first set of specifications into an initial script, where the initial script is executable. The system yet includes receiving, from a second user device, a search input and determining the search input is a member of the searching category. The system also includes, in response to the determining, executing the initial script using the search input to search the one or more databases at the one or more locations to identify the one or more result objects, the one or more result objects being a subset of a plurality of result objects stored at the one or more locations of the one or more databases. The system also includes generating one or more action scripts to perform the type of data processing identified by the one or more action rules. The system further includes rendering at least part of each result object of the one or more result objects according to the one or more rendering rules to produce one or more rendered objects. Each rendered object of the one or more rendered objects includes one or more data options indicating availability of additional data corresponding to the rendered object, and one or more action options indicating availability of data processing of the type of data processing corresponding to the rendered object. The system also includes transmitting, to the second user device, the one or more rendered objects. The system yet includes receiving, from the second user device, one or more communications that identify a rendered object of the one or more rendered object and corresponds to; a selection of an action of the one or more action options; or a selection of a data option of the one or more data options. The system further includes processing the communication by executing the action script corresponding to the rendered object or retrieving and transmitting additional data corresponding to the rendered object. Other embodiments of this aspect include corresponding computer systems, apparatus, and computer programs recorded on one or more computer storage devices, each configured to perform the actions of the systems.

Implementations may include one or more of the following features. The system for configurable searching over databases where determining the search input is a member of the searching category further includes: retrieving a plurality of category inputs in the searching category; comparing the search input to each category input of the plurality of category inputs; and determining the search input matches at least one category input of the plurality of category inputs. The system for configurable searching over databases where determining the search input is a member of the searching category where the first user device and the second user device are a same device and the same device is used by a first user. The system for configurable searching over databases where the type of data processing includes performing a subsequent search, sending a message, processing an invoice, or approving an item. The system for configurable searching over databases where the type of data includes sales orders, invoices, expenses, addresses, contacts, or instructions. The system for configurable searching over databases further including receiving a specification of the first set of specifications of the searching category pertaining to allowing authorized users and identifying a plurality of authorized users of the searching category. The system may also include detecting a user of the second user device and verifying the user is authorized for the searching category. The system for configurable searching over databases further including receiving a second set of specifications for the searching category, where a first authorized user is authorized to use the first set of specifications and a second authorized user is authorized to use the second set of specifications. Implementations of the described techniques may include hardware, a system or process, or computer software on a computer-accessible medium.

A third enablement includes a non-transitory memory with instructions executed for configurable searching over databases, the non-transitory memory with instructions executed on a processor performing the actions including receiving, from a first user device, a first set of specifications for a searching category, each specification of the first set of specifications including a constraint pertaining to performing a type of data processing or availing a type of data following an initial search. The first set of specifications identify: one or more locations in one or more databases; one or more rendering rules; one or more data rules that identify the type of data to avail with each result object of one or more result objects returned for the initial search of the searching category. The non-transitory memory with instructions executed on a processor also includes one or more action rules that identify the type of data processing available to perform with each result object of the one or more result objects returned for the initial search of the searching category. The non-transitory memory with instructions executed on a processor further includes automatically converting the first set of specifications into an initial script, where the initial script is executable. The non-transitory memory with instructions executed on a processor yet includes receiving, from a second user device, a search input and determining the search input is a member of the searching category. The non-transitory memory with instructions executed on a processor also includes, in response to the determining, executing the initial script using the search input to search the one or more databases at the one or more locations to identify the one or more result objects, the one or more result objects being a subset of a plurality of result objects stored at the one or more locations of the one or more databases. The non-transitory memory with instructions executed on a processor also includes generating one or more action scripts to perform the type of data processing identified by the one or more action rules. The non-transitory memory with instructions executed on a processor further includes rendering at least part of each result object of the one or more result objects according to the one or more rendering rules to produce one or more rendered objects. Each rendered object of the one or more rendered objects includes one or more data options indicating availability of additional data corresponding to the rendered object, and one or more action options indicating availability of data processing of the type of data processing corresponding to the rendered object. The non-transitory memory with instructions executed on a processor also includes transmitting, to the second user device, the one or more rendered objects. The non-transitory memory with instructions executed on a processor yet includes receiving, from the second user device, one or more communications that identify a rendered object of the one or more rendered object and corresponds to; a selection of an action of the one or more action options; or a selection of a data option of the one or more data options. The non-transitory memory with instructions executed on a processor further includes processing the communication by executing the action script corresponding to the rendered object or retrieving and transmitting additional data corresponding to the rendered object. Other embodiments of this aspect include corresponding computer non-transitory memory with instructions executed on a processor s, apparatus, and computer programs recorded on one or more computer storage devices, each configured to perform the actions of the non-transitory memory with instructions executed on a processor s.

Implementations may include one or more of the following features. The non-transitory memory with instructions executed on a processor for configurable searching over databases where determining the search input is a member of the searching category further includes: retrieving a plurality of category inputs in the searching category; comparing the search input to each category input of the plurality of category inputs; and determining the search input matches at least one category input of the plurality of category inputs. The non-transitory memory with instructions executed on a processor for configurable searching over databases where determining the search input is a member of the searching category where the first user device and the second user device are a same device and the same device is used by a first user. The non-transitory memory with instructions executed on a processor for configurable searching over databases where the type of data processing includes performing a subsequent search, sending a message, processing an invoice, or approving an item. The non-transitory memory with instructions executed on a processor for configurable searching over databases where the type of data includes sales orders, invoices, expenses, addresses, contacts, or instructions. The non-transitory memory with instructions executed on a processor for configurable searching over databases further including receiving a specification of the first set of specifications of the searching category pertaining to allowing authorized users and identifying a plurality of authorized users of the searching category. The non-transitory memory with instructions executed on a processor may also include detecting a user of the second user device and verifying the user is authorized for the searching category. The non-transitory memory with instructions executed on a processor for configurable searching over databases further including receiving a second set of specifications for the searching category, where a first authorized user is authorized to use the first set of specifications and a second authorized user is authorized to use the second set of specifications. Implementations of the described techniques may include hardware, a non-transitory memory with instructions executed on a processor or process, or computer software on a computer-accessible medium.

BRIEF DESCRIPTION OF THE DRAWINGS

A further understanding of the nature and advantages of various embodiments may be realized by reference to the following figures. In the appended figures, similar components or features may have the same reference label.

DETAILED DESCRIPTION

Figure 1:
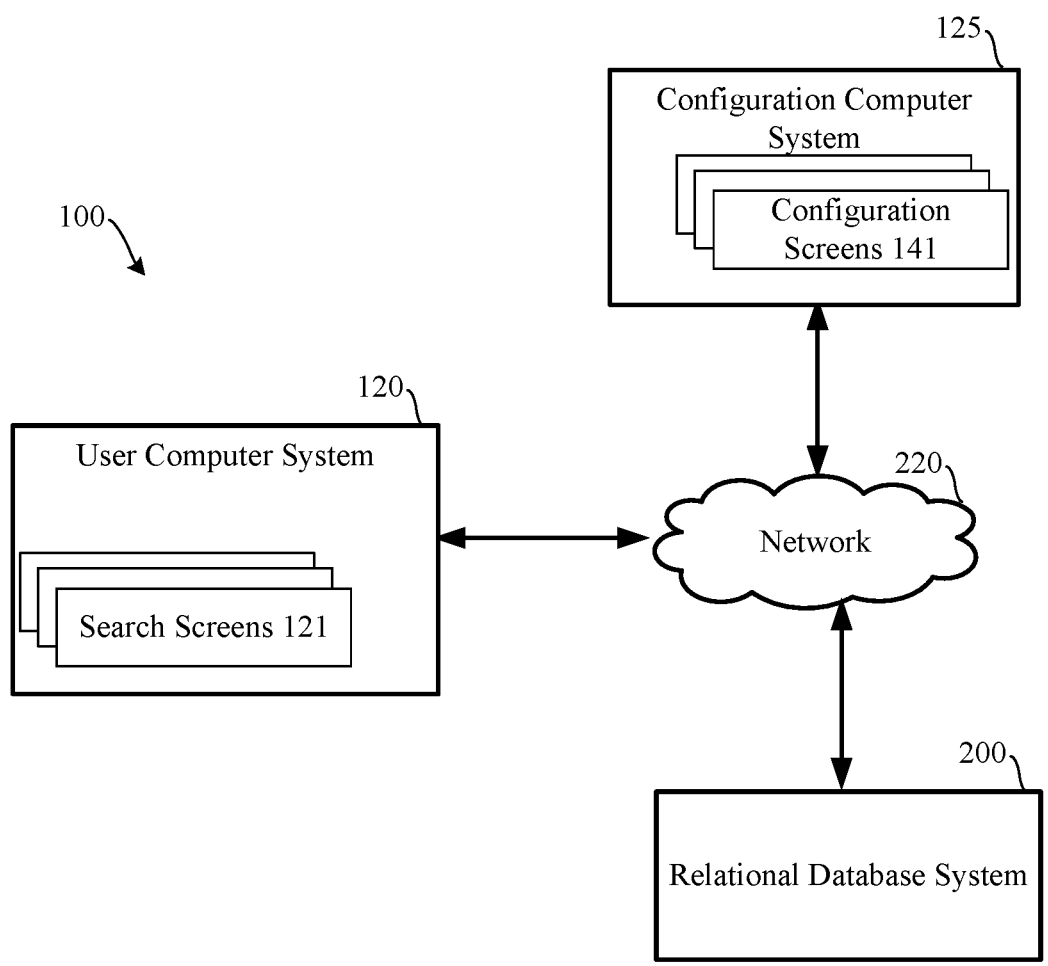
FIG. 1 illustrates an embodiment of a system for providing an interface to a relational database.

In the following description, for the purposes of explanation, specific details are set forth in order to provide a thorough understanding of embodiments of the invention. However, it will be apparent that various embodiments may be practiced without these specific details. The figures and description are not intended to be restrictive.

As noted above, many types of computing systems and applications generate vast amounts of data pertaining or resulting from operation of that computing system or application. These vast amounts of data are frequently then stored into collected locations. Some embodiments disclosed herein relate to technologies to be used to define and to execute queries to retrieve select data.

Some embodiments of the invention correspond to a top-level search engine. The top-level search engine is configured to receive input that can identify a constraint and/or specification for each of one or more configurable search categories. Receiving input that identifies a constraint and/or specification for one or more search categories can include (for example) detecting user input received locally or at a remote device via a graphical user interface and/or detecting an upload of a file (e.g., a JSON or XML, file).

In some instances, a search category can constrain or specify which of one or more databases (e.g., which can include any data store, data structure, files and/or tables) are to serve as a query object to be queried in response to receiving search input. A query object may be further defined using one or more constraints or specifications) of which part(s) of a database are to serve as a query object to be queried in response to receiving search input. Thus, for example, input could identify a set of database files (e.g., by naming convention, partial address and/or file extension) and intra-database data elements (e.g., particular tables, worksheets, rows and/or columns) within the database files to be queried in response to receiving search input.

A search program (e.g., application or servlet) can be generated based on any indicated specifications, constraints and/or definitions of the query object. It will be appreciated that a query object may include (for example) one or multiple databases (and/or parts thereof). The search program may be configured to receive a query, execute a query and/or perform a lookup function using one or more authentication and/or permission characteristics associated with a user. Execution of the query may cause a graphical user interface to be presented that receives search input and that generates and executes a query (e.g., one or more defined data objects) using the search input.

Search categories can, in some instances, identify different types of data elements. For example, one or more first data elements can correspond to elements that are to be searched to determine whether a constraint from a search input is satisfied. When the constraint it satisfied, a value from each of one or more second data elements (which may partially or completely overlap with the one or more first data elements or may not overlap at all) can be retrieved to define a particular search result that is to be rendered.

In some (alternative or additional) instances, a search category can constrain or specify how a search result is rendered or presented. For example, a search category can identify one or more data headings to correspond to one or more retrieved types of data. A search category can identify a position and/or size of a table or other presentation structure via which data is to be presented. A search category can define a rule indicating an ordering (e.g., with respect to individual results and/or data elements within results).

In some (alternative or additional) instances, a search category can constrain or specify a functionality of a rendering of one or more search results. For example, a functionality can include a security and/or access-constraint functionality, which may indicate what types of authorizations are required (e.g., via a whitelist, position indication, login credential, and so on) to use a search program and/or to retrieve data from part or all of one or more defined data objects that are defined for the search program. As another example, a functionality can include how to respond (e.g., via an interface update and/or data provision) in response to detecting a particular type of user input (e.g., a click on a result) and/or event. The response may further or alternatively depend on a number of matching search results identified and/or a characteristic of one, more, or all of the search results.

It will be appreciated that a search category can be dynamically, statically, consistently or inconsistently applied across users and/or requests. For examples, a query object and/or rendering protocol may be differentially applied depending on a user, user authorization level, and/or associated task assignments.

The following detailed description together with the accompanying drawings will provide a better understanding of the nature and advantages of the present disclosure.

FIG. 1 illustrates an embodiment of a system 100 for providing an interface to a relational database. System 100 may include relational access server system 110, user computer system 120, configuration computer system 125 and relational database server system 130. In some embodiments, each of these components are distinct computer systems. In other embodiments, a single piece of hardware, or group of hardware (e.g., server group) can function as multiple components of system 100. For instance, Relational access server system 110 may be performed by a common piece or set of computerized hardware as relational database server system 130.

User computer system 120 may be a personal computer, laptop, tablet computer, smart phone, or various other forms of a computing device that may be used by an end user. For example, referring to FIG. 10, a smartphone (as client computing device 1004), HMD (as client computing device 1002), a tablet computer (as client computing device 1006), or device 1008 may function as various forms of user computer systems. Whatever the form of user computer system 120, user computer system 120 may be capable of either executing or at least accessing (e.g., via a web browser) a configurable search application. User computer system 120 may be in communication with relational access server system 110. User computer system 120 may directly access relational database system 200, such as via a direct connection. Or, in some embodiments, the functions of relational database system 200 may be executed by a same piece or group of hardware as user computer system 120. In many embodiments, relational database system 200 is accessible via one or more networks, such as the Internet and/or a corporate local area network (LAN) by user computer system 120.

Configuration computer system 125 may be a personal computer, laptop, tablet computer, smart phone, or various other forms of a computing device that may be used by an end user. For example, referring to FIG. 10, a smartphone (as client computing device 1004), HMD (as client computing device 1002), a tablet computer (as client computing device 1006), or device 1008 may function as various forms of user computer systems. Whatever the form of configuration computer system 125, configuration computer system 125 may be capable of either executing or at least accessing (e.g., via a web browser) a configurable search application. Configuration computer system 125 may be in communication with relational access server system 110. Configuration computer system 125 may directly access relational database system 200, such as via a direct connection. Or, in some embodiments, the functions of relational database system 200 may be executed by a same piece or group of hardware as configuration computer system 125. In many embodiments, relational database system 200 is accessible via one or more networks, such as the Internet and/or a corporate local area network (LAN) by configuration computer system 125

While system 100 of FIG. 1 illustrates user computer system 120 and configuration computer system 125 in communication with relational database system 200, it should be understood that this is merely an example. Many more user computer systems 120 and configuration computer systems 125 may be access relational database system 200 in order to access data stored by relational database system 200. For instance, hundreds of user computer systems 120 and configuration computer systems 125 may be accessing the relational access server during a given time period.

User computer system 120 is shown with search screens 121. User computer system 120 can access one or more search screens 121 to accept input search terms. Configuration computer 125 is shown with configuration screens 141. Configuration computer 125 can accept search configuration instructions on such configurations screens 141. Network 220 is described in detail in FIG. 2 and facilitates communication between user computer system 120, configuration computer 125, and relational database system 200.

Figure 2:
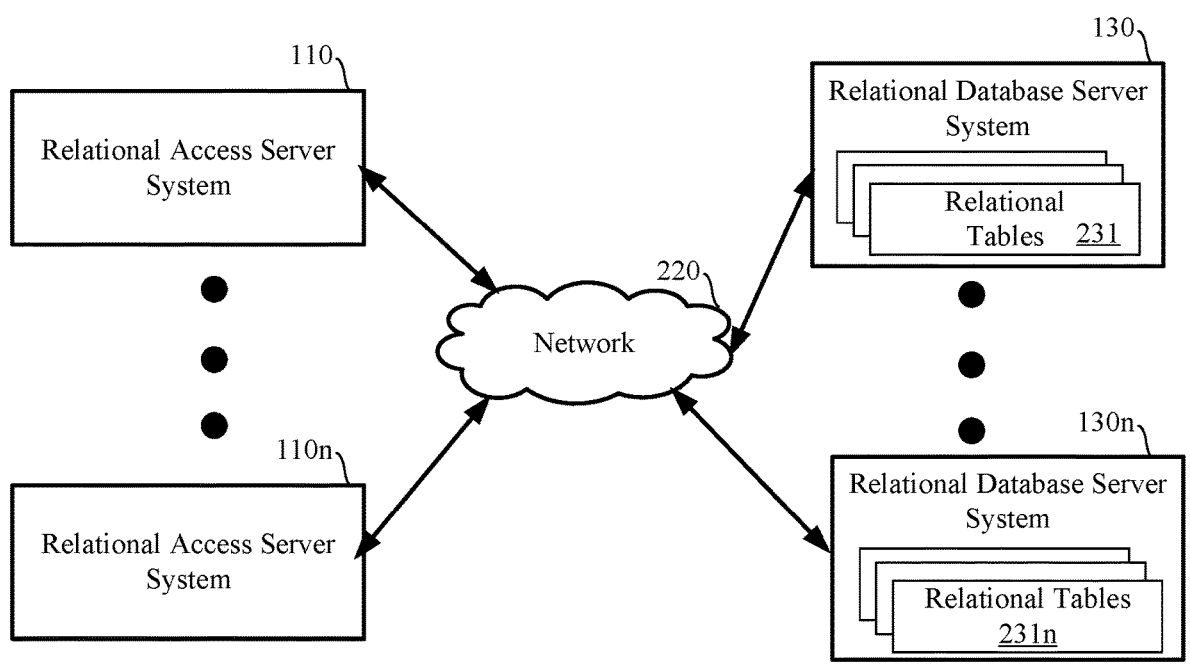
FIG. 2 illustrates another embodiment of a system for providing an interface to a relational database and a multi-dimensional database.

FIG. 2 illustrates another embodiment of a relational database system 200 for providing an interface to a relational database and a multidimensional database. Relational database system 200 may represent a more detailed embodiment of system 200 of FIG. 1. Relational database system 200 may include: relational access server system 110, and relational database server system 130.

In some embodiments, the configurable search application may be executed locally by user computer. In relational database system 200, user computer system 120 executes configurable search application locally. In other embodiments of relational database system 200, configurable search application may be executed remotely. For instance, configurable search application may be presented via a web-based interface, such as a web browser, to user via user computer system 120 while execution of configurable search application is managed by a remote server. For instance, in such embodiments, configurable search application may be understood as a web or cloud service.

Relational access server system 110 may serve as an intermediary between user computer system 120 and relational database server system 130. Relational access server system 110 may: receive various forms of requests from user computer system 120, process such requests, access one or more relational databases on relational database server system 130, and provide responses to user computer system 120. As such, requests for data in relational database server system 130 may be routed to relational access server system 110 by user computer system 120. Relational access server system 110 may manage user authorization and authentication for accessing data stored in relational tables of relational database server system 130. Relational access server system 110 may also serve to retrieve metadata for data stored by relational database server system 130. This metadata may be used to configure a portion of the configurable search application presented on user computer system 120 properly. Further, Relational access server system 110 may serve to retrieve and modify data stored by relational database server system 130. Such data may be presented via the configurable search application on user computer system 120. User computer system 120 may be in communication with relational access server system 110. Relational access server system 110 may directly access relational database server system 130, such as via a direct connection. Or, in some embodiments, the functions of relational access server system 110 may be executed by a same piece or group of hardware as relational database server system 130. In many embodiments, relational access server system 110 communicates via one or more networks, such as the Internet and/or a corporate local area network (LAN) with relational database server system 130.

Relational database server system 130 may host one or more relational databases, which each may include multiple tables that store various data. Beyond relational access server system 110, various services and other systems may be in communication with relational database server system 130 to perform queries on stored data, add data, delete data, and/or modify data.

User computer system 120 may communicate with relational access server system 110 via network 220. Network 220 may represent one or more networks functioning in concert to communicatively connect user computer system 120 with relational access server system 110. Network 220 may include the Internet. Network 220 may also include one or more corporate intranets. Similarly, network 220 may serve to connect user computer system 120 with one or more other servers that permit access to a database, such as a different type of database. While the illustrated embodiment of system 200 illustrates user computer system 120 as being in communication with relational access server system 110 this is merely an example. Or, in other embodiments, user computer system 120 may be in communication with other instances of relational access servers and/or multidimensional access servers and/or other types of servers that permit access to various forms of databases.

Multidimensional access server 230 may permit configurable search application 210 to be executed by user computer system 120 to interact with one or more multidimensional databases, such as one or more multidimensional databases stored by multidimensional database server 240. For example, one form of multidimensional database with which multidimensional access server 230 may interact may be Oracle's® Essbase (Extended Spread Sheet database). Multidimensional access server 230 may serve to receive, format, and otherwise handle requests from user computer system 120 that relate to data stored by multidimensional database server 240 in one or more multidimensional databases.

A relational database may include multiple tables, such as indicated by multiple relational tables 231 being stored by relational database server system 130. Each of these tables may store information about a particular entity. Therefore, within a relational database, each table can be understood as representing one entity. In each table, an attribute (or field) may be required to be present (possibly represented as a column) that serves as a "primary key." The primary key is unique for each row within the table and, thus, can be used to locate a particular record or row within the table. Present within a table may be a "foreign key." A foreign key may be used to cross-reference another table of the relational database to obtain other, related information. Therefore, if multiple dimensions of information are to be retrieved from a relational database, it is likely necessary to access multiple tables within the relational database. For example, in a relational database, employee information such as employee number, name, and salary may be stored in an employee table and department information such as department number and department name, may be stored in a separate, department table. The employee numbers and the department numbers may serve as the primary keys for the employee and department tables, respectively. The employee table can store a department number of each employee, which can act as a foreign key to access related information in the department table. Throughout each figure it should be understood configuration computer system 125 can communicate with relational database system 200 in the same manner as does user computer systems 120.

Figure 3:
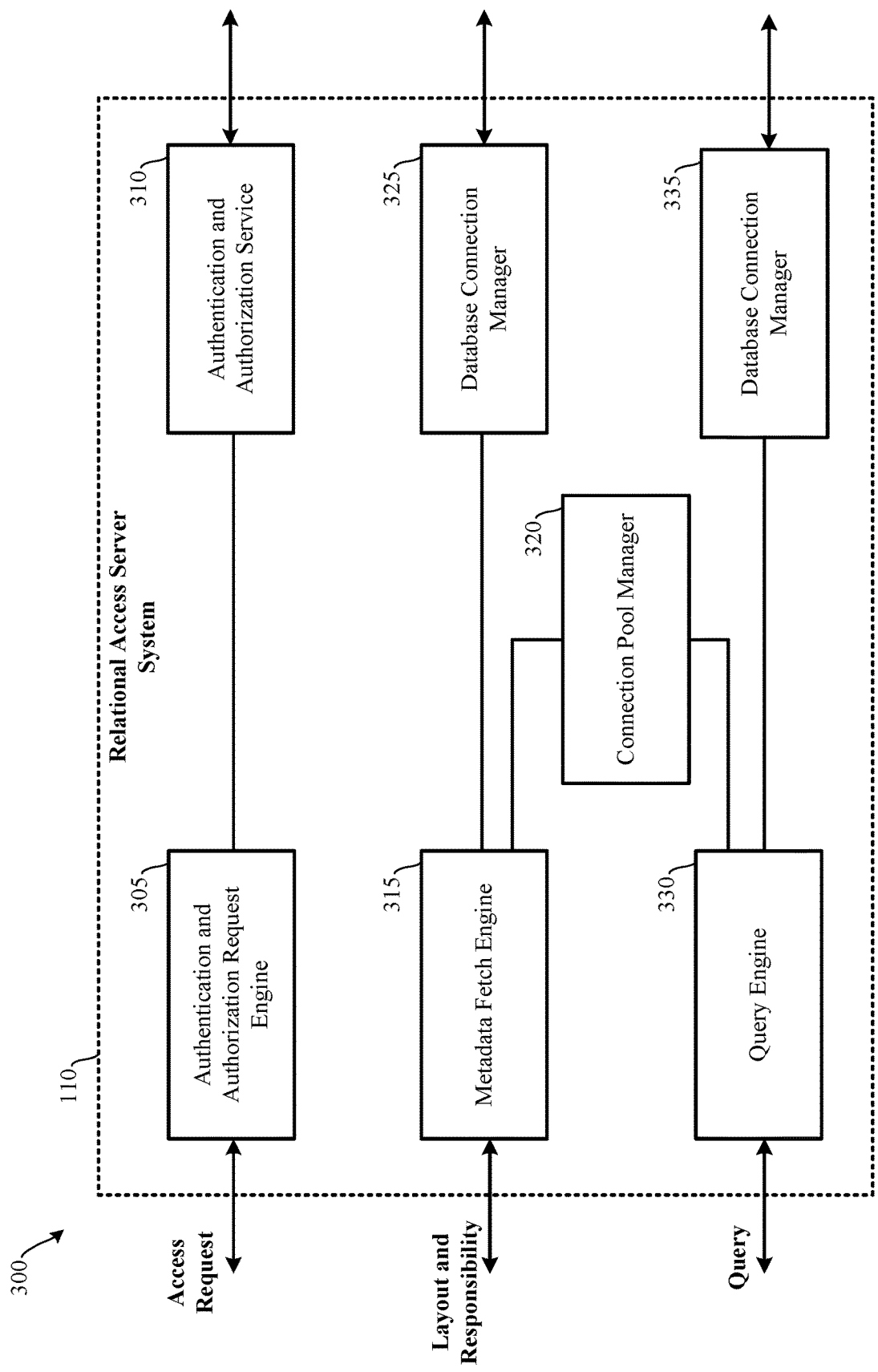
FIG. 3 illustrates an embodiment of a relational access server.

FIG. 3 illustrates an embodiment 300 of a relational access server. Relational access server system 110, as presented in embodiment 300, may represent relational access server system 110 as presented in FIG. 2. Embodiment 300 provides various additional details of how relational access server system 110 may function as an intermediary between a user computer system 120 and a relational database server system 130. Relational access server system 110 may include: authentication and authorization request engine 305, authentication and authorization service 310, metadata fetch engine 315, the connection pool manager 320, database connection manager 325, query engine 330, and database connection manager 335. The various components of relational access server system 110 may be implemented as hardware, firmware, and/or software executed by underlying hardware. Such components may be broken out into additional distinct components or combined into fewer components. It should be understood that input/output to the left of relational access server system 110 may be with a user computer system executing a configurable search application while input/output to the right of relational access server system 110 may be with a relational database server system.

Authentication and authorization request engine 305 may serve to handle requests for authorization and authentication received from a user computer system, via a configurable search application. Prior to viewing, editing, or otherwise accessing data stored in a relational database, it may be necessary to determine a user's authorization and, possibly, authenticate the user. For example, this authorization and authentication may involve a username and password being supplied. In some embodiments, via an interface presented in the configurable search application, a user may provide an access request that includes a username and password. In some embodiments, the configurable search program (e.g., via an installed extension) may store the username and password to save the user from having to enter such information each time access to the relational database is desired. Communication between the configurable search application having the installed configurable search extension may occur via an XML protocol configured for the communication between Relational access server system 110 and user computer systems. Such an XML protocol may be used for the access request for authorization and authentication Further an XML protocol may be used for metadata fetching and data queries.

Following receipt of the access request by authentication and authorization request engine 305, authentication and authorization request engine 305 may format the access request and send data to authentication and authorization service 310. Authentication and authorization service 310 may also be hosted by relational access server or may be hosted remotely, such as by another computer system in communication with the relational database. Authentication and authorization service 310 may be a Java Authentication and Authorization Service (JAAS). By using such a pluggable JAAS, authorization and authentication may be managed separately from the relational database. Authentication and Authorization service 310 may access the relational database or some other data storage structure to determine: if the user is authorized to access the relational database, whether the user is authenticated, and what permissions the user has for the relational database (e.g., read-only access, read/write access). Authentication and authorization service 310 may return a response to authentication and authorization request engine 305, which may, in turn, format and send a response to the user computer system executing the configurable search application. If the user is not authenticated or has insufficient permissions to access the relational database, an error message may be returned to the configurable search application.

Following successful authorization and authentication, a user may indicate a responsibility and a layout. The layout may refer to the format in which a user would like to see the retrieved data in the configurable search application. The layout may function as the data binding layer that connects each cell in the configurable search application to a row and/or attribute in the data retrieved from relational tables. The format can be of type header, in which only one row is displayed as header information in the configurable search or of type table, in which more than one row is displayed in the configurable search. The format may also map database attributes or one or more columns to each cell or column in the configurable search. The responsibility specified by the user may alter the access the user has to data in the relational database. The responsibility specified by the user may correspond to the user's job role. For instance, if the responsibility specified is "manager" the data presented may vary from if the user specified "foreman." In this example "manager" might have access to data from all organizations and "foreman" from few.

Metadata fetch engine 315 may receive the user's indication of responsibility and layout via an XML-based message and may access database connection manager 325 to retrieve the corresponding metadata from the relational database. First, in order to access the relational database, a connection to the relational database may be obtained. Due to factors such as overhead, it may be more efficient for a smaller number of connections to the database to be shared among multiple processes being handled by web logic server. As such, connection pool manager 320 may be accessed to obtain an available connection to the relational database. This connection may be used then released back to connection pool manager 320 when the metadata fetch is complete. Once a connection has been obtained from connection pool manager 320, metadata fetch engine 315 may access the relational database via database connection manager 325. Database connection manager 325 may be a Java Database Connectivity (JDBC) module, which is configured to serve as an application programming interface (API) between metadata fetch engine 315 and the relational database. The metadata fetched by metadata fetch engine 315 via database connection manager 325 may be obtained from multiple different tables of the relational database. This metadata may indicate the type of data field in which the data will be presented via the configurable search (e.g., string, integer, hierarchal data, etc.). The metadata fetched by metadata fetch engine 315 may be formatted and transmitted to the configurable search application being executed by the user computer systems.

After cells of the configurable search application have been formatted in accordance with the metadata, a query for specific database may be created by the user and submitted to query engine 330. The user may request, for example, all parts for a particular item, parts having a model number beginning with a certain string of characters, or some other form of search/request that can be formulated by the user via the configurable search application. The XML query may be received by query engine 330 and formatted into a form (e.g., a SQL query) that can be used to interrogate the relational database. The user may be permitted to query attributes for which metadata was previously retrieved. For instance, a column related to "part number" may be required to be included in the layout if the user intends to use the part number in formulating the query.

Similarly, as was performed by metadata fetch engine 315, an available database connection may be obtained from connection pool manager 320. Once a connection has been obtained from connection pool manager 320, query engine 330 may access the relational database via database connection manager 335 (which may be the same or a separate instance of the same database connection manager 325) and submit a SQL (or other form of) query. Database connection manager 335 may be a Java Database Connectivity (JDBC) module, which is configured to serve as an application programming interface (API) between query engine 330 and the relational database. The data fetched by query engine 330 via database connection manager 335 may be obtained from multiple different tables of the relational database.

Data retrieved from multiple tables of the relational database by query engine 330 may be formatted into XML statements for transmission to the configurable search application being executed by the user computer system. For example, data from a JDBC SQL query could be in a two dimensional array format. It may be converted to a separated string of values (e.g., separated by a character, such as "|"), where each value corresponds to a cell value in the configurable search. For example, if the JDBC SQL query fetched employee information like employee number and name as:

1032 James Smith
1045 Patrick Evans.

The metadata layout may indicate to show this data in a second row in the configurable search application, the two dimensional data may be converted to a "|" separated string of values as below:

||1032|James Smith|1045|Patrick Evans

In this string, the first two "|" symbols represents empty cells in first row. Similarly "|" strings values may be created for each cell to represent the data type (e.g., number, string, integer, etc.) and/or the status (such as read-only, write/read, etc.). The "|" separated string of cell values, data type, and status are packed as XML and sent to the user computer system for presentation via the configurable search application.

Such data may be transmitted to the user computer system for presentation and manipulation via the configurable search application. The user may be permitted to view and modify the data presented from the relational database. Accordingly, data from multiple tables of the relational database may be presented to the user via a single configurable search. Edits or additions to the data may be submitted to the relational database via query engine 330. As such, a user, via the configurable search application, can make modifications to the data stored by the relational database, view data, and/or run simulations as to the effects of changes (e.g., how does a 10% increase in the cost of labor affect product cost?).

FIGS. 4-7 include illustrations of an interface for execution of a custom search program. The interface may be defined based on input corresponding to search categories with pre-defined configurations. The depicted interfaces can include presentations being displayed at a user device in response to local or remote execution of the search program. The interfaces of FIGS. 4-7 exemplify how a user or agent can define particular query, presentation and interaction configurations to facilitate focused searches and presentations of custom interfaces.

Figure 4:
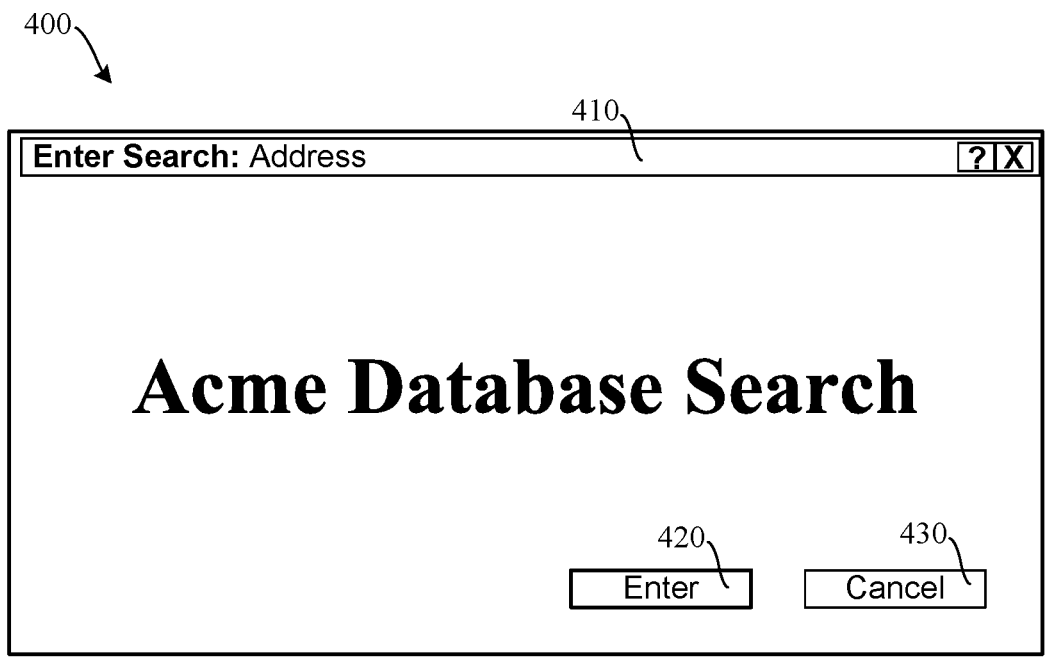
FIG. 4 illustrates embodiments or a configurable search screen shot.

FIG. 4 shows a search interface presentation 400. The search interface presentation 400 includes a single text box 410 configured to receive a text search input—in this case the input is "address." The search interface presentation may also display an enter button 420 or a cancel button 430 as shown, but other embodiments may not have those buttons or may have many more buttons. One of skill in the art will recognize that search interface presentation 400 can take any of a number of forms and the one shown is one of many.

Figure 5:
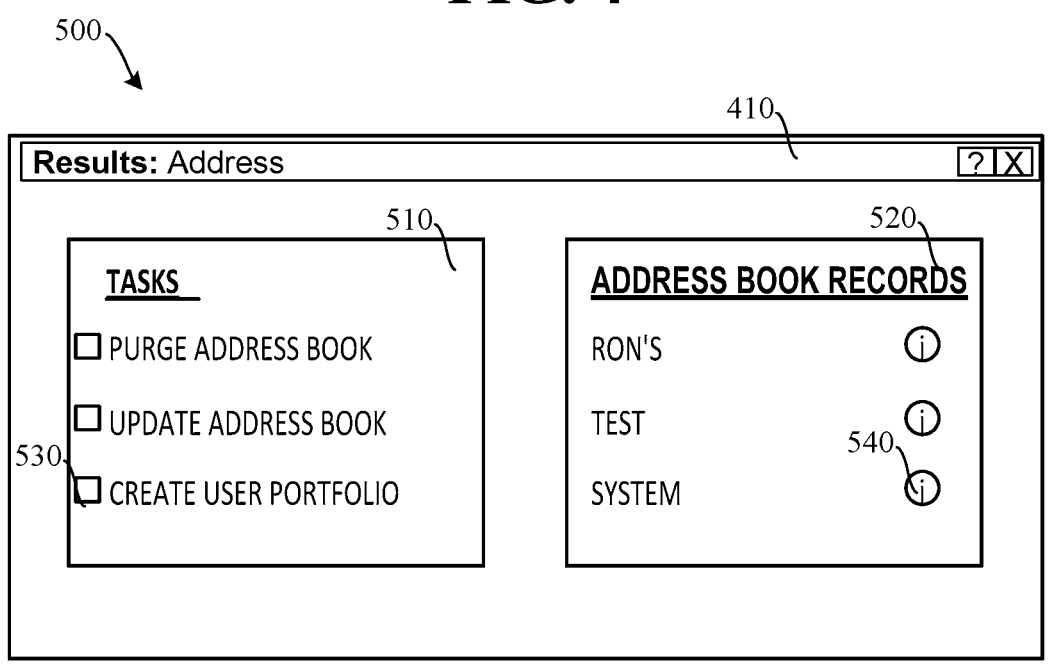
FIG. 5 illustrates an embodiment of a configurable search result.

FIG. 5 shows one exemplary search-results presentation 500 returned in response to detecting the input of "address". Here, the results are separated into two tables, tasks table 510 and address book records table 520. Each table includes data retrieved from a different database (i.e., "Tasks" or "Address Book Record". In each case, a subject is searched for the term "Address", and the subject is also rendered in the presentation. For the tasks table 510 results, a task identifier and a check box 530 is rendered, and for the Address Book Records result, a contact category and information icon 540 for additional information are further identified.

Figure 6:
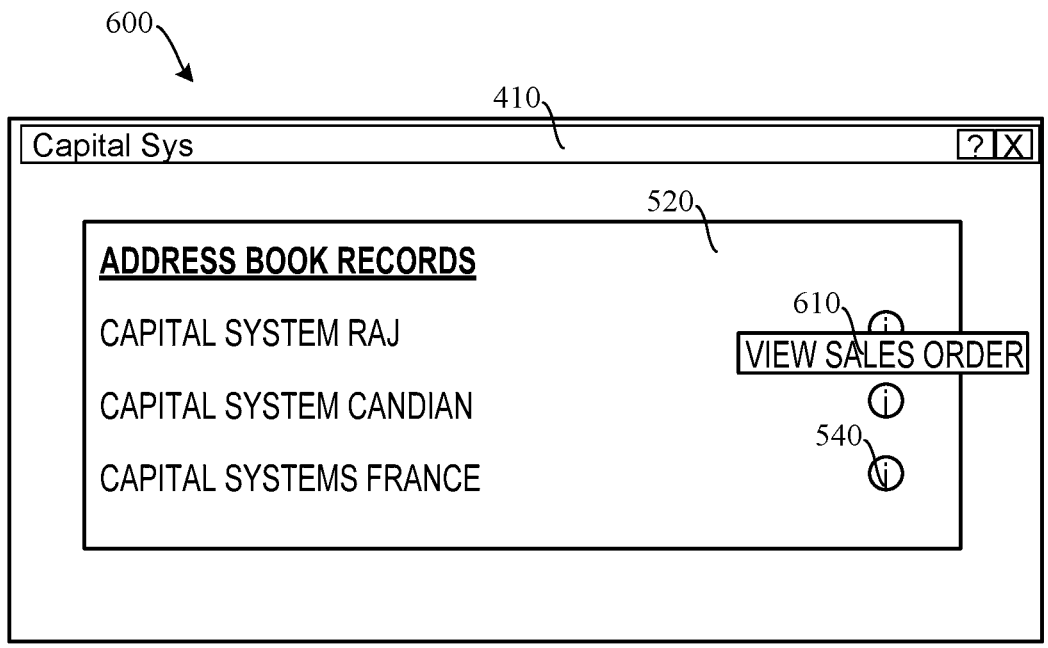
FIG. 6 illustrates an embodiment of a presentation of an additional data selection for a configurable search.

FIG. 6 shows one exemplary search-results presentation 600 returned in response to detecting input of "Capital sys" in search bar 410. Here, each of the results corresponds in the address book records table corresponds to a capital system entity selection. The rendered presentation includes an information icon 540 that indicates that sales order data associated with the record can be presented in response to a click on the information icon 540. In response to clicking the icon, the presentation is updated to that shown in FIG. 7 pop-up table presentation 700, such that a new overlay table 710 is presented that includes various data elements for each of multiple sales orders associated with a particular Capital System entity, Raj, identified in the address book record.

Figure 8A:
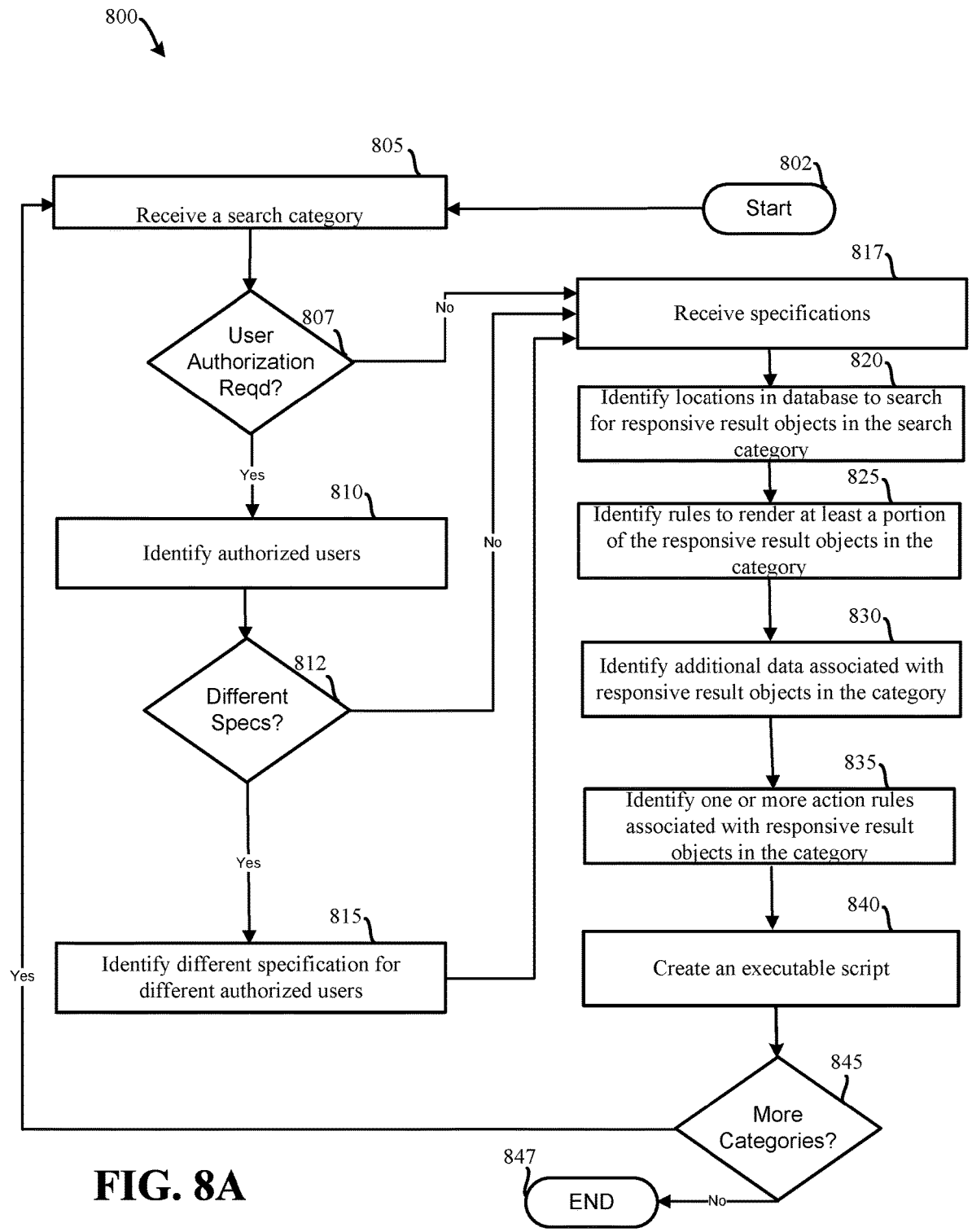
FIG. 8A is a flowchart illustrating a method for configuring searches.

FIG. 8A is a flowchart 800 illustrating a method for configuring searches in one embodiment of the present invention. The method starts at block 802 and proceeds to block 805 where a new search category is received. The search categories are too numerous to list, but a short sampling includes: addresses, customers, suppliers, purchase orders, work orders, employment applications, etc. At block 807 it is determined if the search category is limited to certain users that need authorization to search the category. Some categories, such as employment applications, may be limited, for instance, to only those users in a human resources or legal department. If the search category has unlimited access by any system user than the next block is 817 discussed in detail below. If, however, user authorization is required, at block 810 it is determined which users are authorized to search on that category. For instance, in the case of employee records, all users in human resources could be authorized and all users in a legal department could be authorized to search employee records. In other embodiments, however, the authorization could be more limited such that a human resources user must be at a certain level or higher to search employee credit scores, for instance. One of skill in the art will recognize that assigning authorization for each search category depends on the search category itself, the nature of the records being searched, the organizational needs of the entity implementing configurable searches, and many other criteria. Furthermore, for each search category there may be different search specifications for different users. For instance any user at an entity may be able to search employee records to produce a result containing employee IDs, however, only human resources may search the same employee records to produce ethnicity results. At block 812 it is determined if different authorized users need different search specifications. If not—then specification for the authorized users is received at block 817, discussed further below. At block 815 the different specifications for the authorized users is identified and associated with the authorized user. In some cases the specification may be very simple—any user in an entity can search exactly one location in a database for an employee ID. In other cases the search specification may be much more robust and including multiple databases. For instance, a user from the legal department may be able to search all entity databases for all employee related records. Hence, in this case, the search specification will include at least numerous locations in a variety of databases.

Figure 7:
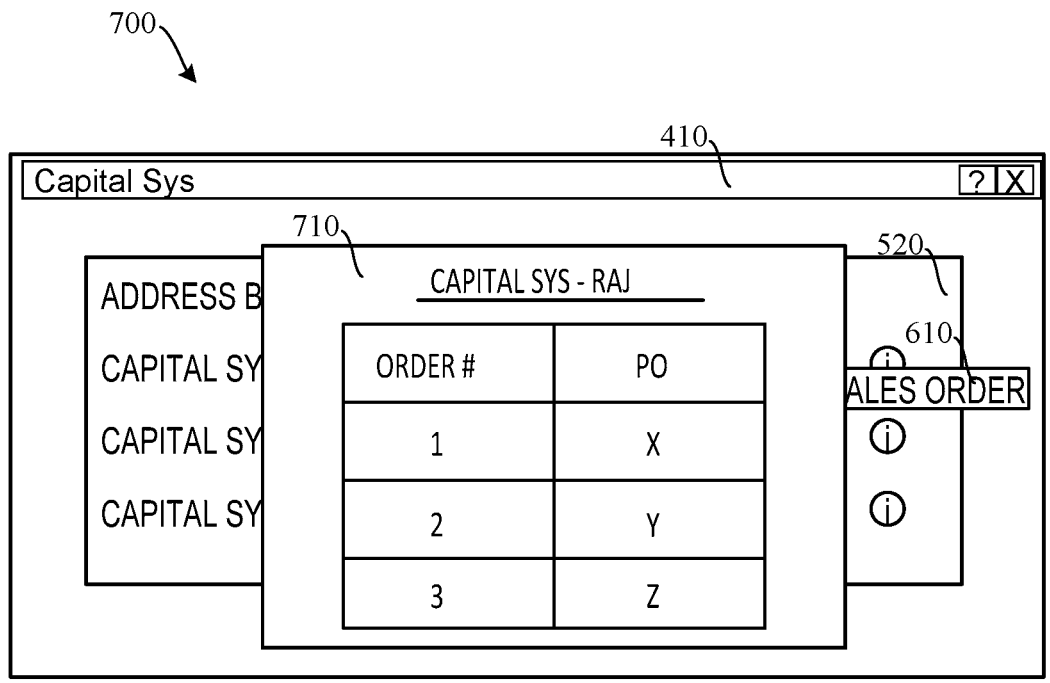
FIG. 7 illustrates an embodiment of a presentation of additional data.

At block 817 the search category specifications are received. A search category specification may identify areas in one or more databases that are to be searched in as shown in block 820. For instance if the search category is "employee ID" and the search category specification is authorized for any user in the entity, then the part of the database that may be searched may be extremely limited so that proprietary and confidential information cannot be seen by unauthorized users. On the other hand if the authorized user for the reach category specification is the VP of human resources—then many more locations in the databases will be identified for searching the search category. A search category may also identify one or more rendering rules for presenting the search results at block 825. The rendering rules may identify placement on the screen, borders, additional buttons, icons, etc. The rendering rules may also be different for different authorized users and different types of search results. Some search results may lend themselves to be presented in a column like presentation where others might be better presented in a spreadsheet like rendering. Furthermore—the rendering rules may determine were information icons and buttons for further action are placed. The rendering rules may control where results are placed and the shape and size based on the number of results of a configurable search. At block 830 the search category specification identifies the rule for the types of additional data to provide with the search results. These additional data provided with a search can include numerous different data types such as: associated sales orders, invoices, expenses, addresses, contacts, instructions, appearances of an item on a parts list, bill of materials, work order, inventory listing, instructions, or other related items. The additional data can be provided as a pop-up screen as shown in FIG. 7. At block 835 further action rules are identified related to further data processing. Further data processing may include a subsequent search, sending a message, approving an item, processing an invoice/transaction, rejecting an item/transaction, deleting a record, duplicating a record, advancing a record, flagging a record, launching an application to provide a more detailed view, or launching an application to provide a view of a specific class of related records. At block 840 an executable script, or initial script, is generated to perform the search, rendering, data providing, and following data processing using the search specification. The executable script can be JavaScript or any other executable script or any suitable executable code block.

Flowchart 800 can be implemented on a first user device in any number of ways. A search configuration application can allow a user to select rules for searching, rendering, providing additional data, and performing additional processing can be presented as selectable items in the application interface. The user of the first user device may also use JSON or any other mark-up language to code the search category specification manually. The user of the first user device is typically an IT administrator with credentials and authority to authorize access to the databases and authorize users to have access. In some cases the user of the first device may want to search as well using the first device to execute the origination script to do so.

Figure 8B:
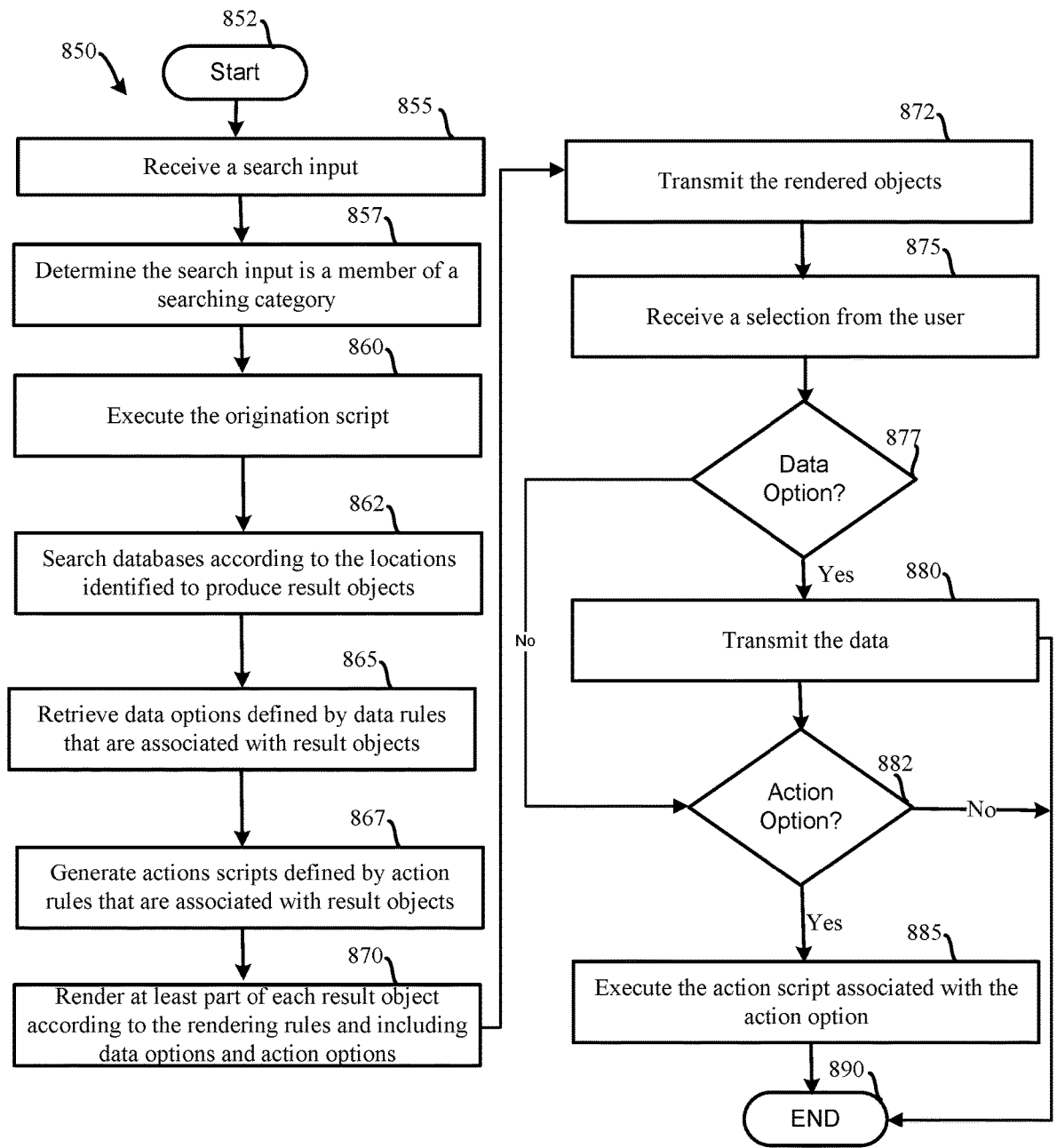
FIG. 8B is a flowchart illustrating a method of implementing a configurable search.

FIG. 8B is a flowchart 850 illustrating a method for implementing configurable searches in one embodiment of the present invention. Flowchart 850 begins at block 852 and at block 855 receives a search input from a second user device. The second user device may be used by any authorized user in an entity. As noted previously, the second user device and the first user device may be the same or may be operated by the same user. The first or second device user will see a presentation such as that shown in FIG. 4. At block 857 it is determined which searching category the search input corresponds to. In some cases the search input will correspond to more than one category. For instance, a search input for "ABC Company" might be responsive to a "Suppliers" category as well as a "Purchase Orders" category. The origination script is executed for the at least one search category at block 860. At block 862 databases are searched according to the search rules for the search category to produce result objects of the search. At block 865 the data defined by the data type rules for the search category is retrieved for the result objects. At block 867 one or more action scripts associated with the data processing rules for the result objects is generated. At block 870 at least part of each result object is rendered according to the rendering rules, including data options associated with the result objects and action options associated with the result objects. At block 873 the rendered objects are transmitted to the second user device. The rendered objects may appear in some embodiments as shown on FIG. 5. If the user of the second device selects to be presented with additional data via data option or perform an action via an action option that option will be received at block 875. At 877 if it is a data option then the data is transmitted to the second user device. At block 882 it is determined if the second user device selected an action option. If so then the action script is executed at block 885 and in one embodiment a presentation as show in FIG. 7 appears on the second user device. Block 890 is the end.

Figure 9:
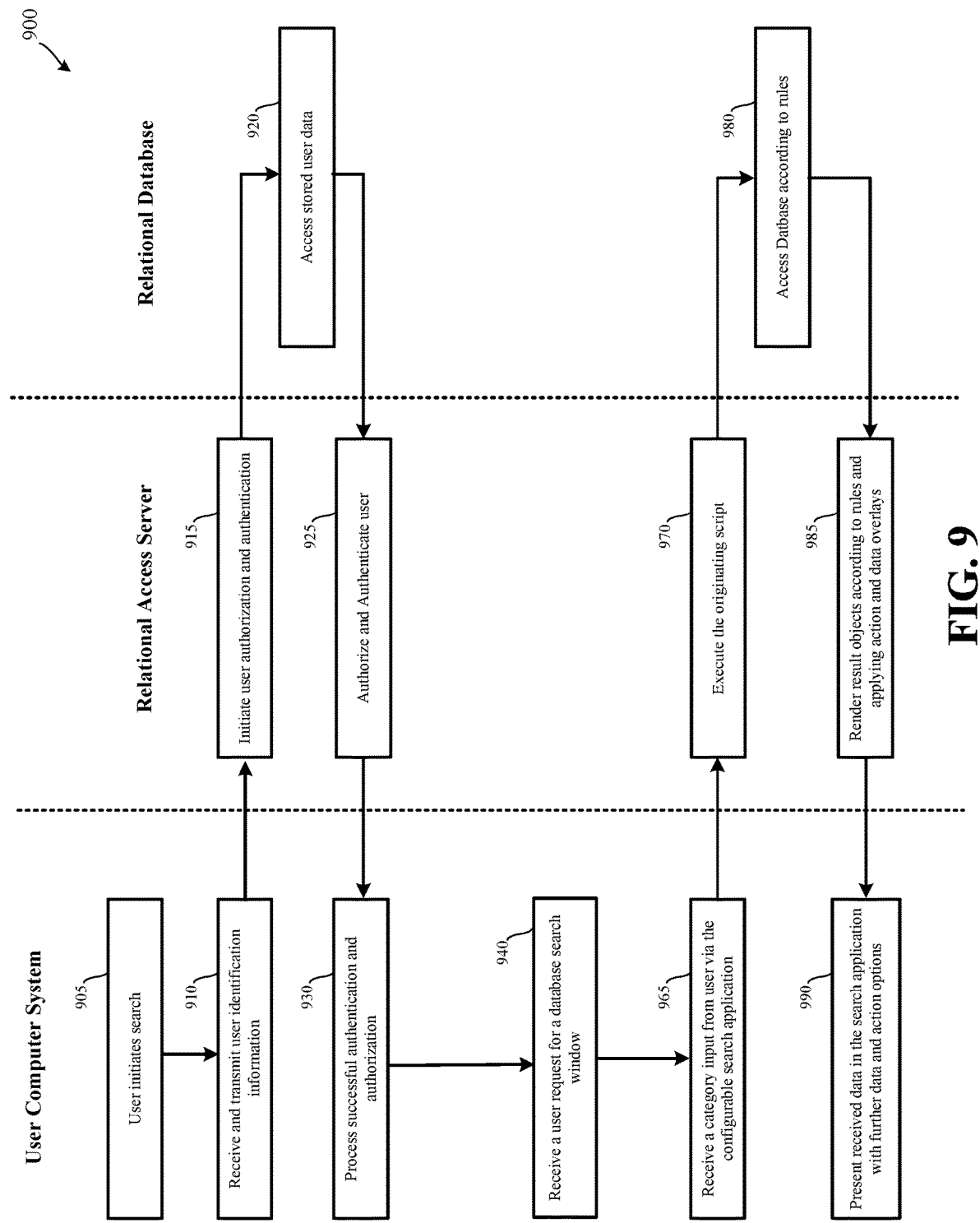
FIG. 9 illustrates another embodiment of a method for providing an interface to a relational database.

FIG. 9 illustrates another embodiment of a method 900 for interfacing with a relational database. Method 900 is presented in the form of a swim diagram. Method 900 may be performed using the systems detailed in relation to FIGS. 1-3. Each step of method 900 may be performed by the component noted in the respective column. It should be understood that in some embodiments, the relational access server may be combined with the relational database server or the user computer system.

At step 905, a user may access the configurable search application having an add-on (e.g., one or more extensions) that permit the configurable search application to interact with the relational access server. At step 910, the configurable search application may access or receive from the user identification information, such as a username and password. This username and password may be transmitted to the relational access server to permit authorization and authentication. At step 915, the relational access server may initiate a user authorization and authentication process, such as using a JAAS module. In some embodiments, at step 920, the relational database may be accessed to determine if the user is authorized and authenticated to access the relational database. Assuming so, at step 925, the relational access server authorizes and authenticates the user and returns a successful authorization and authentication results to the user computer system at step 930. At step 930, this successful authentication and authorization may be processed by the user computer system, such as by presenting successful login information to the user via the configurable search application.

At step 940, input may be received from user that indicate a search input for the configurable search application. At step 965, the user may submit a query to the relational access server. The query may define one or more attribute values for which the user desires corresponding entries in the relational database to be returned. The user may be permitted to enter wildcards. In some embodiments, such as illustrated in FIG. 7, a pop-up window may be used by the user to select various entries in the relational database to be included on the configurable search. The request sent to the relational access server at step 965 may be in the form of an XML request.

At step 970, the relational access server may execute the initial script received from the user computer system. A connection to the relational database may be obtained from a connection pool. At step 980, the query may result in entries and associated attribute data being retrieved from multiple tables of the relational database.

The relational access server may access one or more tables of the relational database to retrieve the data corresponding to the request received at block 855. A SQL query may be formatted by the relational access server to interrogate the relational database. Attribute data from tables of the relational database may be retrieved for the entries corresponding to the query received at step 980. In some embodiments, each attribute may be retrieved from a different table of the relational database. The retrieved entries and associated attribute data from multiple tables may be transmitted to the relational access server and formatted into an XML response by the relational access server at step 985. At step 990, the translated data, which includes one or more entries and attribute data corresponding to the metadata for which at least some cells of the configurable search were already formatted, may be output to the configurable search application.

Figure 10:
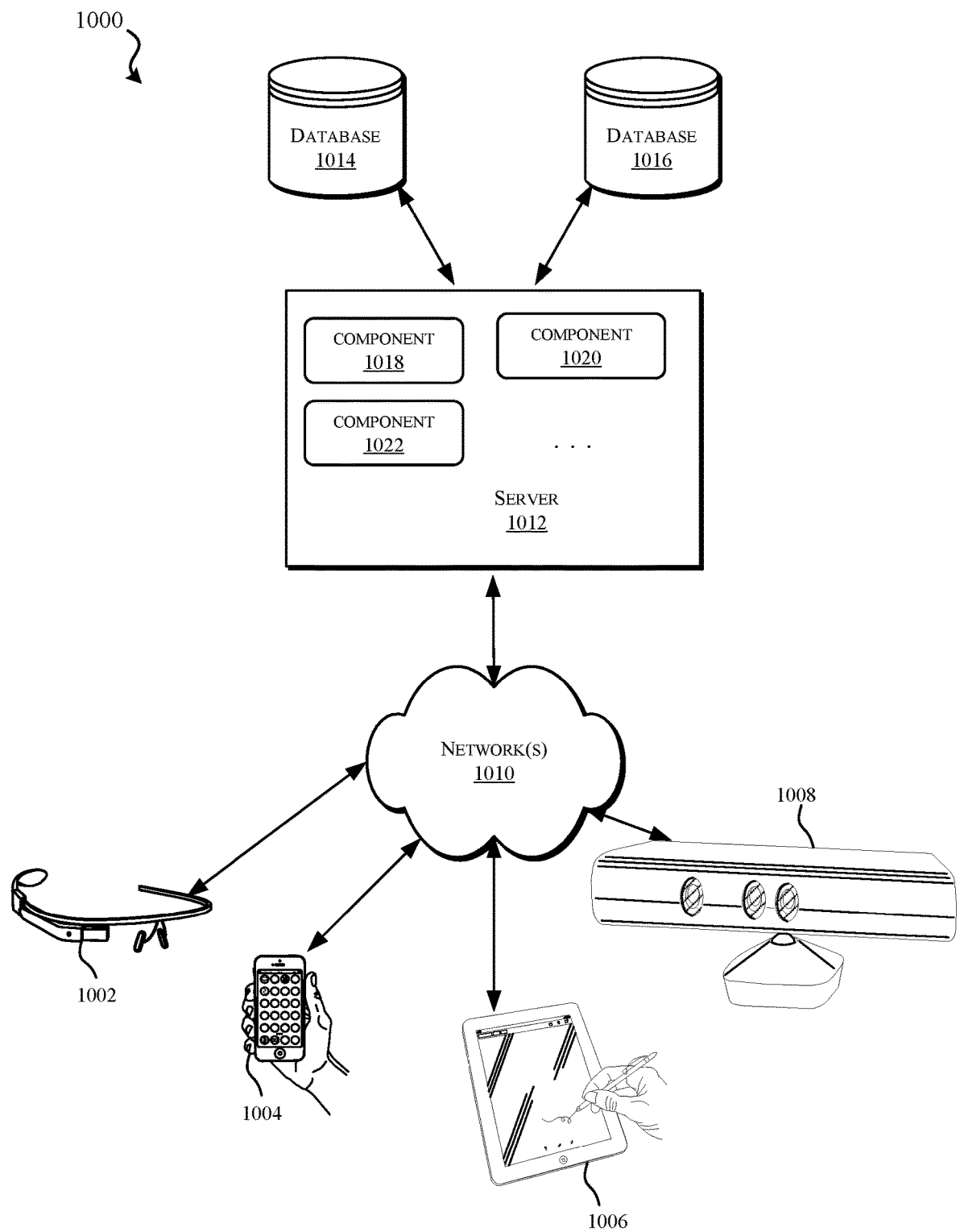
FIG. 10 illustrates a distributed system for implementing various embodiments detailed herein.

FIG. 10 depicts a simplified diagram of a distributed system 1000 for implementing various embodiments detailed in relation to the preceding figures. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010. Client computing devices 1002, 1004, 1006, and 1008 may represent forms of user computer systems, such as user computer system 120 of FIG. 1 and FIG. 2.

In various embodiments, server 1012 may be adapted to run one or more services or software applications provided by one or more of the components of the system. For instance, server 1012 may function as Relational access server system 110 of FIGS. 1-3. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in the figure, the software components 1018, 1020 and 1022 of distributed system 1000 are shown as being implemented on server 1012. For instance, the functions of Relational access server system 110 or the individual components of Relational access server system 110 as presented in FIG. 3 may be implemented as one or more of software components 1018, 1020, and 1022. In other embodiments, one or more of the components of distributed system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google® Glass® head mounted display), running software such as Microsoft Windows Mobile®, and/or a variety of mobile operating systems such as iOS, Windows® Phone, Android®, BlackBerry® 12, Palm® OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux® operating systems. The client computing devices can be workstation computers running any of a variety of commercially-available UNIX® or UNIX-like operating systems, including, without limitation, the variety of GNU/Linux operating systems, such as, for example, Google Chrome OS. Alternatively, or in addition to, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1010.

Although exemplary distributed system 1000 is shown with four client computing devices, any number of client computing devices may be supported. Other devices, such as devices with sensors, etc., may interact with server 1012.

Network(s) 1010, which may also represent network 220, in distributed system 1000 may be any type of network familiar to those skilled in the art that can support data communications using any of a variety of commercially-available protocols, including, without limitation, TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including, without limitation, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. At least one of such databases may be a relational database, such as hosted by relational database server system 130. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
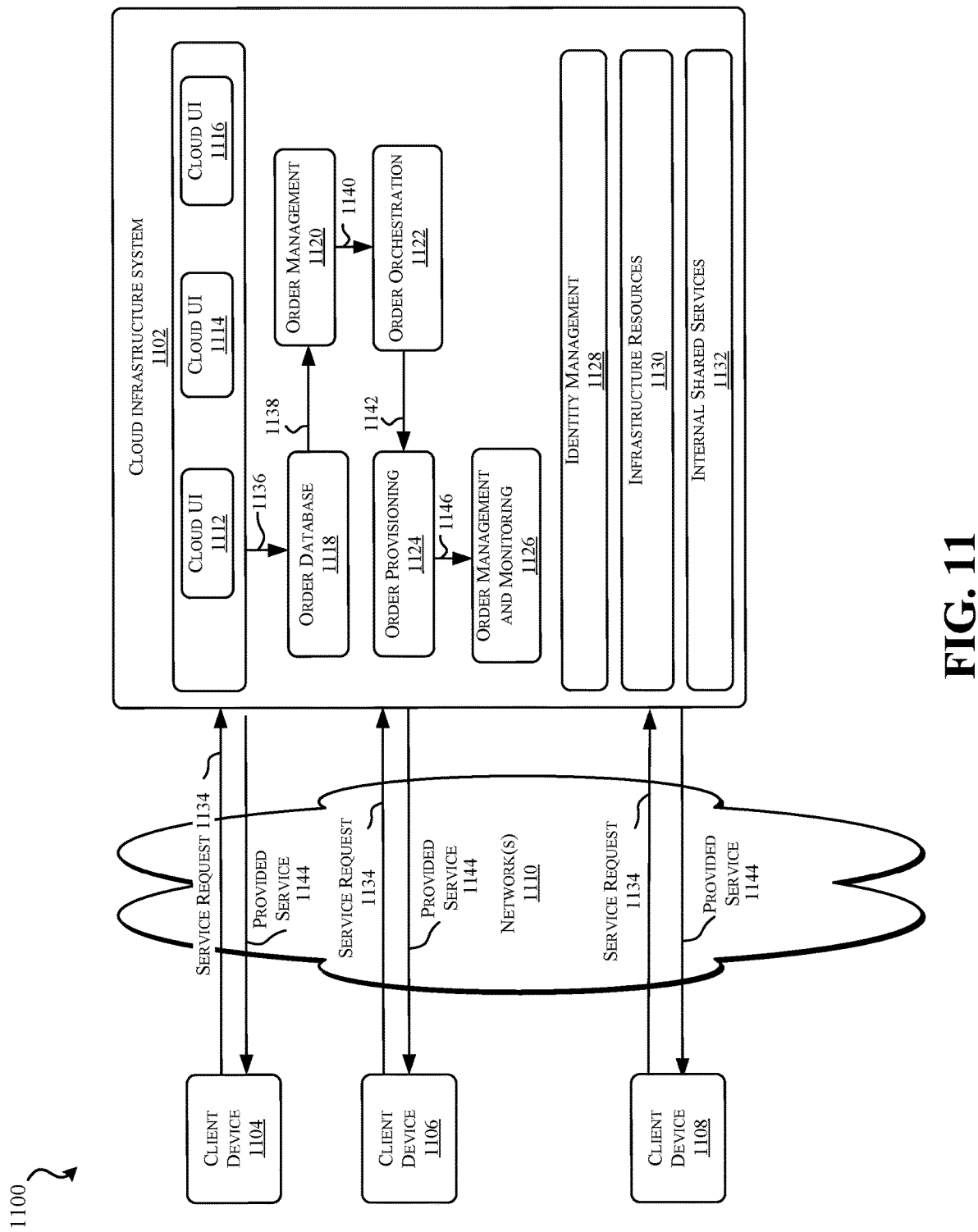
FIG. 11 illustrates a system environment by which services may be offered as cloud services, in accordance with an embodiment of the present disclosure.

FIG. 11 is a simplified block diagram of one or more components of a system environment 1100 by which services provided by one or more components of an embodiment system may be offered as cloud services, in accordance with an embodiment of the present disclosure. As previously detailed, the configurable search application that is presented via user computer systems may be remotely executed, such as in the form of a cloud service. Such a configurable search application can be provided as a service in accordance with the system environment 1100. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1002, 1004, 1006, and 1008. Although exemplary system environment 1100 is shown with three client computing devices, any number of client computing devices may be supported. Other devices, such as devices with sensors, etc., may interact with cloud infrastructure system 1102.

Network(s) 1110 may facilitate communications and exchange of data between client computing devices 1104, 1106, and 1108 and cloud infrastructure system 1102. Each network may be any type of network familiar to those skilled in the art that can support data communications using any of a variety of commercially-available protocols, including those described above for network(s) 1010. Cloud infrastructure system 1102 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, infrastructure resources 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client computing device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116. At operation 1136, the order is stored in order database 1118. Order database 1118 can be one of several databases operated by cloud infrastructure system 1102 and operated in conjunction with other system elements. At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1102 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client computing devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1102 may include an identity management module 1128. Identity management module 1128 may be configured to provide identity services, such as access management and authorization services in cloud infrastructure system 1102. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
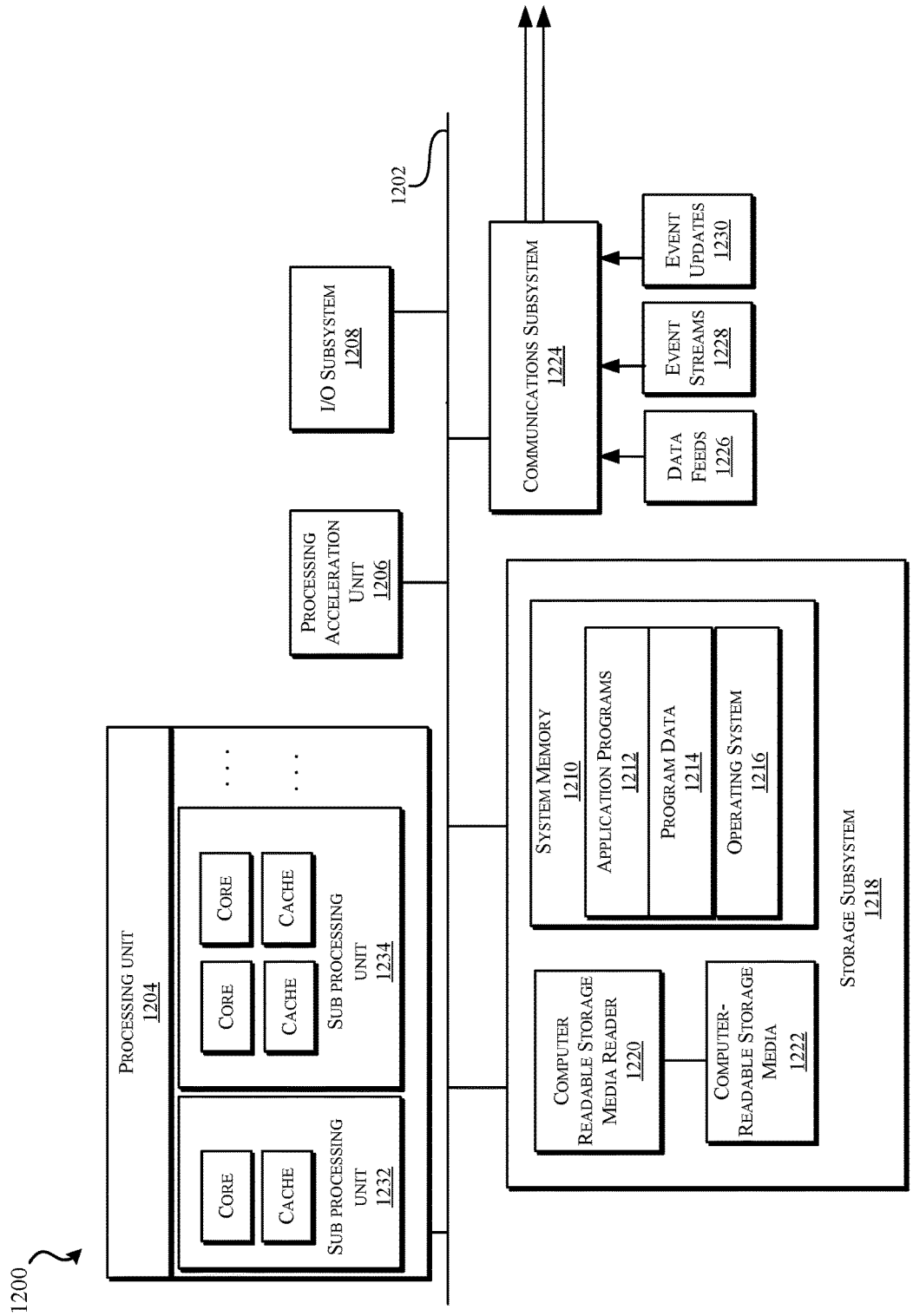
FIG. 12 illustrates an exemplary computer system, in which various embodiments of the present invention may be implemented.

FIG. 12 illustrates an exemplary computer system 1200, in which various embodiments of the present invention may be implemented. Computer system 1200 may be used to implement any of the computer systems previously described, such as the user computer systems, relational access servers, and relational database server systems. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes non-transitory, tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any one of several types of bus structures, including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices, such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including, without limitation, the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present invention.

Storage subsystem 1218 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments, communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A processor-based method for configurable searching over databases, the method comprising:
receiving, from a first user device, a first set of specifications for a searching category, each specification of the first set of specifications including a constraint pertaining to performing a type of data processing or availing a type of data following an initial search, the first set of specifications identifying:
one or more locations in one or more databases;
one or more rendering rules;
one or more data rules that identify the type of data to avail with each result object of one or more result objects returned for the initial search of the searching category; and
one or more action rules that identify the type of data processing available to perform with each result object of the one or more result objects returned for the initial search of the searching category;
automatically converting the first set of specifications into an initial script, wherein the initial script is executable;
receiving, from a second user device, a search input;
determining the search input is a member of the searching category;
in response to the determining, executing the initial script using the search input to:
search the one or more databases at the one or more locations to identify the one or more result objects, the one or more result objects being a subset of a plurality of result objects stored at the one or more locations of the one or more databases;
generate one or more action scripts to perform the type of data processing identified by the one or more action rules; and
render at least part of each result object of the one or more result objects according to the one or more rendering rules to produce one or more rendered objects, each rendered object of the one or more rendered objects comprising:
one or more data options indicating availability of additional data corresponding to the rendered object; and
one or more action options indicating availability of data processing of the type of data processing corresponding to the rendered object;
transmitting, to the second user device, the one or more rendered objects;
receiving, from the second user device, one or more communications that identify a rendered object of the one or more rendered object and corresponds to:
a selection of an action of the one or more action options; or
a selection of a data option of the one or more data options;
processing the communication by:
executing the action script corresponding to the rendered object; or retrieving and transmitting additional data corresponding to the rendered object.

2. The processor-based method for configurable searching over databases of claim 1, wherein determining the search input is a member of the searching category further comprises:
   retrieving a plurality of category inputs in the searching category;
   comparing the search input to each category input of the plurality of category inputs; and
   determining the search input matches at least one category input of the plurality of category inputs.

3. The processor-based method for configurable searching over databases of claim 1, wherein determining the search input is a member of the searching category, wherein the first user device and the second user device are a same device and the same device is used by a first user.

4. The processor-based method for configurable searching over databases of claim 1, wherein the type of data processing includes: performing a subsequent search; sending a message; processing an invoice; approving or rejecting an item; approving or rejecting a transaction; deleting or duplicating a record; advancing or flagging a record; or launching a viewing application.

5. The processor-based method for configurable searching over databases of claim 1, wherein the type of data includes sales orders, invoices, expenses, addresses, contacts, work orders, tasks, incidents, production facilities, warehouses, equipment, or instructions.

6. The processor-based method for configurable searching over databases of claim 1, further comprising:
   receiving a specification of the first set of specifications of the searching category pertaining to allowing authorized users and identifying a plurality of authorized users of the searching category;
   detecting a user of the second user device; and
   verifying the user is authorized for the searching category.

7. The processor-based method for configurable searching over databases of claim 6, further comprising receiving a second set of specifications for the searching category, wherein:
   a first authorized user is authorized to use the first set of specifications; and
   a second authorized user is authorized to use the second set of specifications.

8. A system for configurable searching over databases, the system comprising a relational database system performing actions of:
   receiving, from a first user device, a first set of specifications for a searching category, each specification of the first set of specifications including a constraint pertaining to performing a type of data processing or availing a type of data following an initial search, the first set of specifications identifying:
      one or more locations in one or more databases;
      one or more rendering rules;
      one or more data rules that identify the type of data to avail with each result object of one or more result objects returned for the initial search of the searching category; and
      one or more action rules that identify the type of data processing available to perform with each result object of the one or more result objects returned for the initial search of the searching category;
   automatically converting the first set of specifications into an initial script, wherein the initial script is executable;
   receiving, from a second user device, a search input;
   determining the search input is a member of the searching category;
   in response to the determining, executing the initial script using the search input to:
      search the one or more databases at the one or more locations to identify the one or more result objects, the one or more result objects being a subset of a plurality of result objects stored at the one or more locations of the one or more databases;
      generate one or more action scripts to perform the type of data processing identified by the one or more action rules; and
      render at least part of each result object of the one or more result objects according to the one or more rendering rules to produce one or more rendered objects, each rendered object of the one or more rendered objects comprising:
         one or more data options indicating availability of additional data corresponding to the rendered object; and
         one or more action options indicating availability of data processing of the type of data processing corresponding to the rendered object;
   transmitting, to the second user device, the one or more rendered objects;
   receiving, from the second user device, one or more communications that identify a rendered object of the one or more rendered object and corresponds to:
      a selection of an action of the one or more action options; or
      a selection of a data option of the one or more data options;
   processing the communication by:
      executing the action script corresponding to the rendered object; or
      retrieving and transmitting additional data corresponding to the rendered object.

9. The system for configurable searching over databases of claim 8, wherein determining the search input is a member of the searching category further comprises:
   retrieving a plurality of category inputs in the searching category;
   comparing the search input to each category input of the plurality of category inputs; and
   determining the search input matches at least one category input of the plurality of category inputs.

10. The system for configurable searching over databases of claim 8, wherein determining the search input is a member of the searching category, wherein the first user device and the second user device are a same device and the same device is used by a first user.

11. The system for configurable searching over databases of claim 8, wherein the type of data processing includes: performing a subsequent search; sending a message; processing an invoice; approving or rejecting an item; approving or rejecting a transaction; deleting or duplicating a record; advancing or flagging a record; or launching a viewing application.

12. The system for configurable searching over databases of claim 8, wherein the type of data includes sales orders, invoices, expenses, addresses, contacts, work orders, tasks, incidents, production facilities, warehouses, equipment, or instructions.

13. The system for configurable searching over databases of claim 8, further comprising:
   receiving a specification of the first set of specifications of the searching category pertaining to allowing authorized users and identifying a plurality of authorized users of the searching category;

detecting a user of the second user device; and verifying the user is authorized for the searching category.

14. The system for configurable searching over databases of claim 13, further comprising receiving a second set of specifications for the searching category, wherein:

a first authorized user is authorized to use the first set of specifications; and a second authorized user is authorized to use the second set of specifications.

15. A non-transitory computer-readable medium having sets of instructions stored thereon for configurable searching over databases, which, when executed by a computer, cause the computer to perform actions of:

receiving, from a first user device, a first set of specifications for a searching category, each specification of the first set of specifications including a constraint pertaining to performing a type of data processing or availing a type of data following an initial search, the first set of specifications identifying:

one or more locations in one or more databases;

one or more rendering rules;

one or more data rules that identify the type of data to avail with each result object of one or more result objects returned for the initial search of the searching category; and one or more action rules that identify the type of data processing available to perform with each result object of the one or more result objects returned for the initial search of the searching category;

automatically converting the first set of specifications into an initial script, wherein the initial script is executable;

receiving, from a second user device, a search input;

determining the search input is a member of the searching category;

in response to the determining, executing the initial script using the search input to:

search the one or more databases at the one or more locations to identify the one or more result objects, the one or more result objects being a subset of a plurality of result objects stored at the one or more locations of the one or more databases;

generate one or more action scripts to perform the type of data processing identified by the one or more action rules; and render at least part of each result object of the one or more result objects according to the one or more rendering rules to produce one or more rendered objects, each rendered object of the one or more rendered objects comprising:

one or more data options indicating availability of additional data corresponding to the rendered object; and one or more action options indicating availability of data processing of the type of data processing corresponding to the rendered object;

transmitting, to the second user device, the one or more rendered objects;

receiving, from the second user device, one or more communications that identify a rendered object of the one or more rendered object and corresponds to:

a selection of an action of the one or more action options; or a selection of a data option of the one or more data options;

processing the communication by:

executing the action script corresponding to the rendered object; or retrieving and transmitting additional data corresponding to the rendered object.

16. The non-transitory computer-readable medium having sets of instructions stored thereon for configurable searching over databases of claim 15, wherein determining the search input is a member of the searching category further comprises:

retrieving a plurality of category inputs in the searching category;

comparing the search input to each category input of the plurality of category inputs; and determining the search input matches at least one category input of the plurality of category inputs.

17. The non-transitory computer-readable medium having sets of instructions stored thereon for configurable searching over databases of claim 15, wherein determining the search input is a member of the searching category, wherein the first user device and the second user device are a same device and the same device is used by a first user.

18. The non-transitory computer-readable medium having sets of instructions stored thereon for configurable searching over databases of claim 15, wherein the type of data processing includes: performing a subsequent search; sending a message; processing an invoice; approving or rejecting an item; approving or rejecting a transaction; deleting or duplicating a record; advancing or flagging a record; or launching a viewing application.

19. The non-transitory computer-readable medium having sets of instructions stored thereon for configurable searching over databases of claim 15, wherein the type of data includes sales orders, invoices, expenses, addresses, contacts, work orders, tasks, incidents, production facilities, warehouses, equipment, or instructions.

20. The non-transitory computer-readable medium having sets of instructions stored thereon for configurable searching over databases of claim 15, further comprising:

receiving a specification of the first set of specifications of the searching category pertaining to allowing authorized users and identifying a plurality of authorized users of the searching category;

detecting a user of the second user device; and verifying the user is authorized for the searching category.

* * * * *

UNITED STATES PATENT AND TRADEMARK OFFICE
CERTIFICATE OF CORRECTION

| | | |
|---|---|---|
| PATENT NO. | : 10,599,681 B2 | Page 1 of 1 |
| APPLICATION NO. | : 15/656060 | |
| DATED | : March 24, 2020 | |
| INVENTOR(S) | : Rodgers | |

It is certified that error appears in the above-identified patent and that said Letters Patent is hereby corrected as shown below:

In the Drawings

On sheet 8 of 11, in FIG. 9, under Reference Numeral 980, Line 1, delete "Datbase" and insert -- Database --, therefor.

In the Specification

In Column 5, Line 17, delete "processor s," and insert -- processor(s), --, therefor.

In Column 5, Line 20, delete "processor s." and insert -- processor(s). --, therefor.

In Column 6, Line 56, delete "XML," and insert -- XML --, therefor.

In Column 8, Line 45, delete "125" and insert -- 125. --, therefor.

In Column 11, Lines 24-25, delete "authentication Further" and insert -- authentication. Further --, therefor.

In Column 13, Line 7, delete "Smith" and insert -- Smith. --, therefor.

Signed and Sealed this
Tenth Day of November, 2020

Andrei Iancu
*Director of the United States Patent and Trademark Office*